April 12, 1927.
H. H. HAIGHT
GEAR PUMP
Filed March 11, 1925    3 Sheets-Sheet 1

1,624,099

INVENTOR.
Hiram H. Haight
BY
Erwin, Wheeler & Woolard
ATTORNEYS.

April 12, 1927. H. H. HAIGHT 1,624,099
GEAR PUMP
Filed March 11, 1925    3 Sheets-Sheet 2

INVENTOR.
BY Hiram H. Haight
Erwin, Wheeler & Voland
ATTORNEYS

April 12, 1927.

H. H. HAIGHT

GEAR PUMP

Filed March 11, 1925

INVENTOR.
Hiram H. Haight
BY Erwin, Wheeler & Woolard
ATTORNEYS

Patented Apr. 12, 1927.

1,624,099

UNITED STATES PATENT OFFICE.

HIRAM H. HAIGHT, OF MILWAUKEE, WISCONSIN.

GEAR PUMP.

Application filed March 11, 1925. Serial No. 14,636.

This invention relates to improvements in gear pumps.

I have illustrated the invention embodied in a pump of the type in which a spur gear or pinion meshes with internal teeth on an eccentric ring. The invention is particularly adapted for use in that type of pump.

One of the objects of the invention relates to a novel organization of the inlet and outlet ports of a pump of this character, whereby to minimize resistance to the passage of water through the pump, by eliminating as far as possible sharp bends or curves in the path which the water is obliged to follow.

It is a further important object of this invention to provide a novel type of bearing for a pump of this character which is so organized that the lubricant will not reach the fluid pumped and the fluid handled by the pump will not reach the bearing surfaces. Such a construction is of great advantage where syrups and the like are being pumped, since the syrups would be spoiled if lubricant reached them, and syrups in a bearing have the quality of becoming carbonized and destroying the smooth running qualities of the bearing.

It is a further important object of the invention to provide a construction such that the pump may be altered in accordance with the character of the fluid to be handled thereby. The inlet and outlet ports of any pump case are ordinarily made as large as is practical in order to minimize frictional resistance to fluid flow. Nevertheless, in order that the pump may operate efficiently the capacity of the pump must bear a proportion to the capacity of the inlet and outlet ports, which is determined in large part by the character of the liquid pumped, such factors as viscosity being primarily taken into consideration. An inlet and outlet may be of such a size as to enable a gear pump to function efficiently in pumping air or the like, since air is a fluid which passes with little friction through the ports. On the other hand, if the same pump were employed to handle syrup or molasses it would operate very inefficiently since the capacity of the pump itself would far exceed the amount of such liquids which could flow through the inlet and outlet passages. As a consequence partial vacuums would be formed in the interdental spaces of the gear pump, due to the inability of the liquid to flow into such spaces fast enough to fill them, and as a result there would be great energy lost.

It is sometimes the case that a given pump installation is required to handle liquids of varying viscosity, and it is one of the objects of this invention to provide means for altering the capacity of the pumping gears so as to maintain the proper proportion between the pump capacity and the rate of flow of a particular liquid through the inlet and outlet ports.

In the drawings.

Like parts are identified by the same reference characters throughout the several views.

Figure 1:
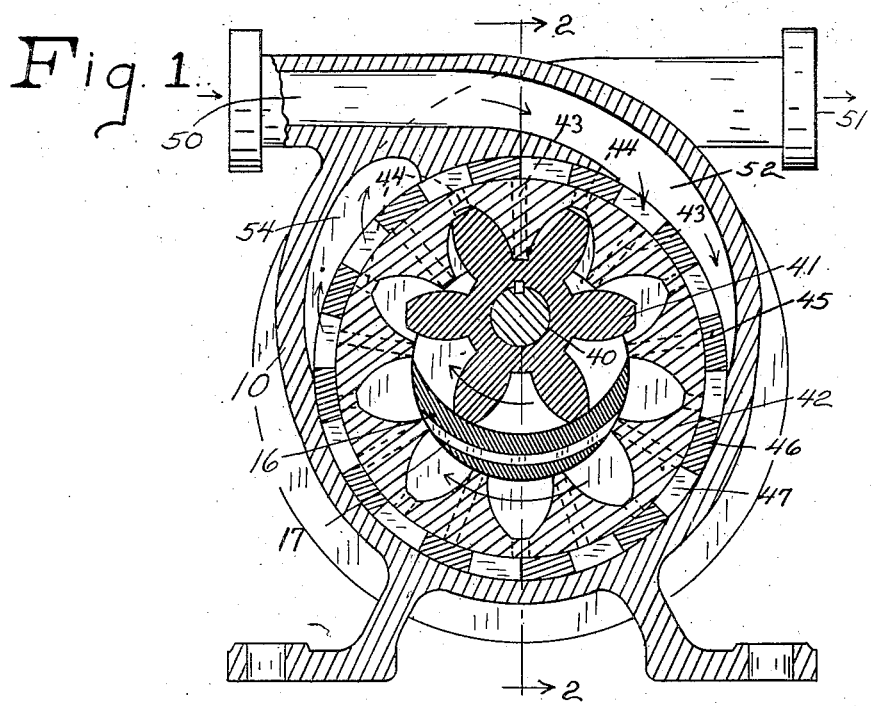
Figure 1 is a section taken on line 1—1 of Figure 2 transversely of the axis of the pump shaft.

The pump comprises an annular casing wall 10 closed at its ends by disk-like end plates 11 and 12 which are preferably shouldered as at 13 to be received within wall 10. The usual crescent shaped baffle 16 is supported from end plates 11 and 12 and may be made in two parts 16ª and 16ᵇ meeting substantially in the plane of the section in which Figure 1 is taken, in the center of the pump casing. If desired, an arcuately extending sector of a packing ring may be employed as at 17 and may be fitted within suitable grooves formed in the abutting faces of the portions 16ª and 16ᵇ of the crescent baffle.

Projecting axially from each of the end plates 11 and 12 is a sleeve, including the two parts 20 and 21 which are in axially spaced relation and are integrally joined with the end plates and with each other by means of the interconnecting arms 22. The arms 22 may be considered as parts of the combined sleeve portions 20 and 21, which are offset to provide an opening 23 into which packing material may be introduced in the manner hereinafter to be described.

The sleeve portions 21 are provided with outstanding ears 26 which are capped to receive bolts 27. A bushing or bearing sleeve 30 is receivable in each of the sleeves connected with end plates 11 and 12 and is headed at 31 to provide means engageable by bolts 27 to hold the bushings or bearing sleeves in place.

A packing gland is formed at 32 in sleeve portion 20 and is adapted to receive the packing material 33. Each of the bushings extends into the sleeve portion 20 to subject the packing material 33 and gland 32 to compression to an extent which may be regulated by turning up bolts 27. When it becomes necessary to replace or add to the amount of packing material at 33, it is merely necessary to unscrew bolt 28 to such an extent as to permit the end of sleeve 30 to be withdrawn across recess 23. With the bushing 30 thus supported and guided, it is possible to introduce packing into the gland much more readily than would be the case if it were necessary wholly to remove the bushing.

Each bushing 30 is preferably provided internally near its inner end with an annular groove or recess 34 which communicates through upper and lower openings 35 with the space 23. Into one of such openings leads a flush pipe 36 which is preferably provided with a valve-controlled connection with some source of water supply. Through this means it is possible to flush out any undesired material tending to penetrate either from the bearing within bushing 30 toward the packing material 33 or from packing gland 32 toward the bearing. The bearing in the interior of bushing 30 may be lubricated in the usual manner by means of a grease cup 38 communicating with the bearing surface.

The usual pump shaft 40 has a bearing in the bushing sleeves 30 on opposite ends of the pump casing, and upon this shaft is mounted the pinion 41, the teeth of which correspond in radius to the inner surface of the crescent shaped sector 16 in the usual manner. The pinion meshes with a floating ring gear 42 which preferably is provided with a number of radial passages 43 opening from the extremities of its inwardly projecting teeth to its exterior periphery, and with passages 44 opening from its interdental spaces to its periphery. These passages provide for the ingress and egress of fluids from the active portion of the pump, it being understood that the pump operates by a displacement of material resulting from the meshing in one side of the pump casing of the teeth of the pinion 41 and gear 42.

It is the usual practice in manufacturing a pump of this character to mount the ring gear 42 for rotation directly within the casing annulus 10. I prefer, however, to interpose a bushing member to take up wear between these parts, and I have found that the provision of such a member is perfectly practicable providing the bushing member is made in the form of a lantern ring, as shown at 45. It is particularly to be noted that the spacing of the bars 46 of the bushing ring and the apertures 47 thereof is such that the bars and spaces are of substantially equal peripheral extent and such extent is slightly smaller than the peripheral distance between adjacent passages 43 and 44. As a result of this construction it is impossible for the bars of the lantern ring wholly to close simultaneously two or more consecutive discharge or inlet passages. As the teeth of the pinion approach a position of full mesh with the teeth of the gear or recede from such position they will always be tilted toward one side or the other in their respective interdental spaces of the gear, and consequently there will always be a possibility for fluid trapped in a passage which is sealed by the lantern ring 45 to escape in one direction or the other toward a passage which is open. For this reason the provision of passages 43, as well as those at 44, is very desirable in conjunction with the use of the particular type of lantern ring bushing shown at 45.

Figure 3:
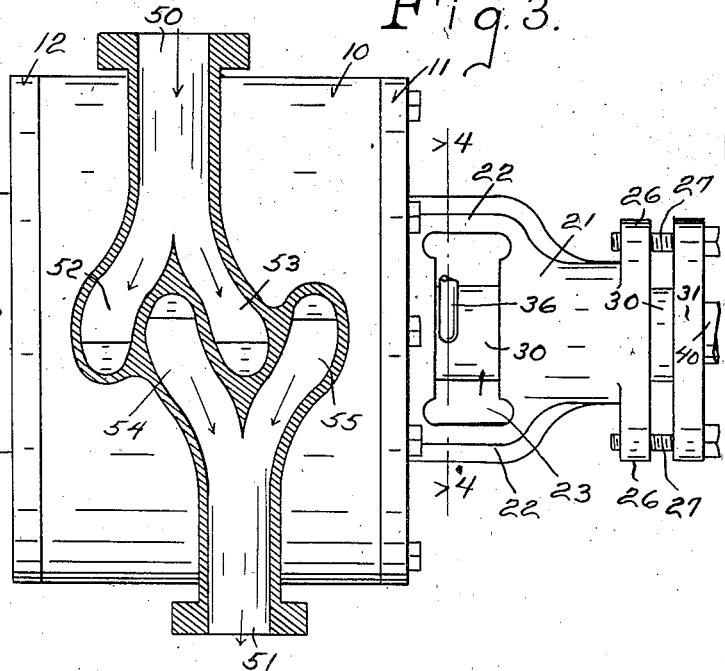
Figure 3 is a section taken on line 3—3 of Figure 2.

In order to facilitate the flow of liquid through the pump and at the same time to maintain the inlet and outlet connections of the pump in substantial alignment, I prefer to have the inlet and outlet passages cross each other as shown. It is usual for the inlet passage 50 to communicate with the left hand side of the pump casing, as viewed in Figure 1, while the outlet passage 51 communicates with the right hand side thereof. It will be obvious, however, that in such an arrangement the liquid is forced to make sharp turns in entering and in leaving the pump casing proper. This consumes energy and is undesirable for that reason. In the device herein illustrated, the inlet passage 50 divides into subordinate passages 52 and 53 which extend across the top of annulus 10 and curve gradually to merge ultimately with the arc of the interior of the pump casing. Similarly, the outlet port originates in divided passages 54 and 55 which gradually digress from the arc of the interior of the pump casing upwardly and to the right from the left hand side of the casing and are united in the single outlet passage 51. In the central upper portion of the device the passages 52, 54, 53, and 55 are in staggered relation, as is clearly shown in Figure 3. I have found such an arrangement to minimize resistance to current flow through the pump and at the same time to distribute the incoming liquid to both sides or the rotors or gears in a manner which would not be possible if undivided inlet and outlet passages were employed. It will be clear that if the inlet passage were upon one side of the pump casing and the outlet passages on the other, the entire flow of liquid to the interdental spaces of the rotors would be but from one side with a consequent loss of capacitative efficiency. Likewise, the egress of the fluid would be from one side only with a further loss of efficiency. As a result of the construction illustrated, communication between the inlet and outlet passages is afforded directly with both sides of the rotors and the liquid is not caused to make any sudden changes in direction.

In stating the objects of this invention I called attention to the fact that in handling viscous materials or other materials which do not flow readily there is a tendency for the friction of the inlet and outlet passages so to retard the flow that the material will not fully fill the interdental spaces on the inlet side of the pump. In other words, it is desirable where viscous or some heavy materials are handled to provide means for reducing the capacity of the pumping mechanism so that such mechanism will handle at all times the full amount of liquid which may be admitted and discharged through the ports. Furthermore, it is frequently desirable to use a given pump installation and to have it operate efficiently with different kinds of liquids.

To suit such requirements I have provided in the pump herein disclosed an interchangeable set of rotors so that upon the mere removal of one of the heads 11 or 12 of the pump it is possible readily to substitute for gears 41 and 42 through gears of less axial extent and of correspondingly reduced pumping capacity.

Figure 2:
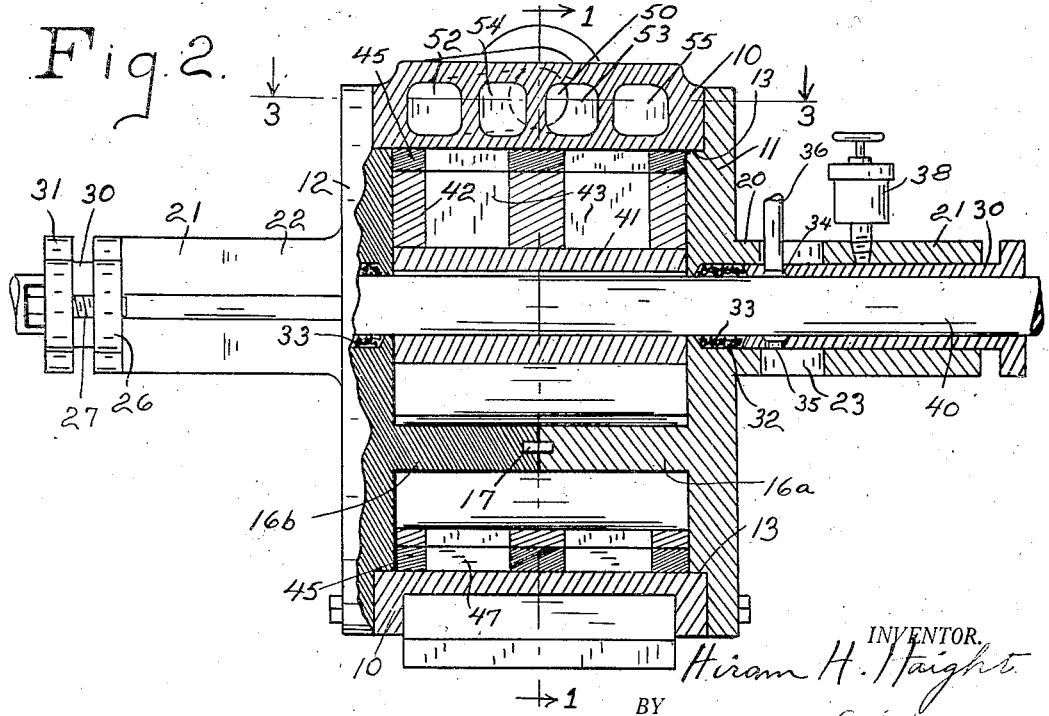
Figure 2 is a section taken on line 2—2 of Figure 1 parallel to the axis of the pump shaft.
Figure 4:
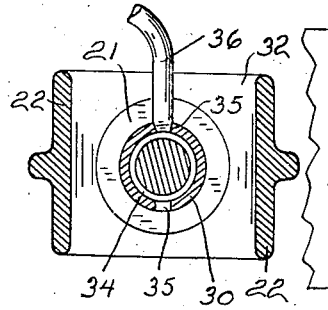
Figure 4 is a detail view taken on the section line indicated at 4—4 in Figure 3.

In order to employ smaller rotors in a given size of casing, such as that shown in the drawings herein, it is necessary to use one or more floating ring members 60 and 61. These members are fitted within the casing to abut the rotors 41 and 42 upon either side and have an effect somewhat as if the thickness of the heads 11 and 12 of the casing were variably increased to the extent represented by the axial dimension of these rings. Obviously, however, the rings and the substitute rotors 41' and 42' may be made up in sets, any one of which may be substituted in the case for that shown therein in Figure 2, so that the capacity of the pumping device per se may be varied in wide limits without materially changing the installation of the casing. With each such set a suitable floating bushing 45' will be used for the purposes already described.

Since the purpose of the interchangeable sets of rotary and floating elements in this device is to handle viscous liquids effectively, it is desirable to maintain as great as possible a capacity for the inlet and outlet passages at all points. Accordingly, the filler rings 60 and 61 are preferably formed with laterally and radially opening ducts 63 and 64 in positions to enable fluid entering through passage 50 or leaving through passage 51 to have ingress or egress from the interdental spaces at the sides thereof. The ducts 63 and 64, therefore, supplement passages 44' and 47' of the ring 42' and the lantern bushing 45'.

Figure 6:
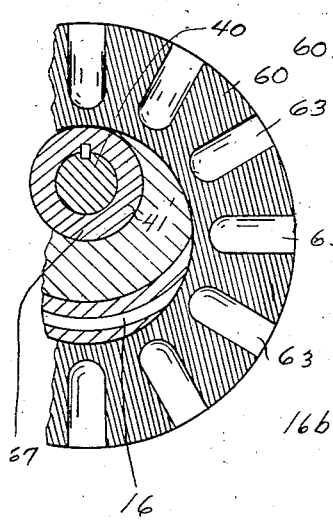
Figure 6 is a section taken on line 6—6 of Figure 5.

Since it is desirable to make the filler rings 60 and 61 of the floating type to avoid any necessity for anchoring them, and also to reduce friction in the interior of the pump, I prefer to provide a multiplicity of radial channels 63 and 64 in the manner shown in Figure 6 so that regardless of which portions of the margins of these fillers may be adjacent the ports of the pump casing, there will always be available suitable channels 63 and 64 communicating with the inlet and outlet passages in the casing.

Furthermore in order to make the rings 60 and 61 in such form that they may float within the casing and at the same time to eliminate undesired interior capacity within the pump it is preferable to add to the device separate filler members 65 and 66 which, as indicated in the drawings, are cut to fit between the hub portion 67 of pinion 41', the interior periphery of the ring gear 42', and the crescent-shaped baffle 16. By making these filler members 65 and 66 separately from the rings 60 and 61 the rings are left free to rotate and the construction is greatly simplified. It would be very difficult to manufacture the filler members 65 and 66 integrally with adjacent portions of the floating rings.

Figure 5:
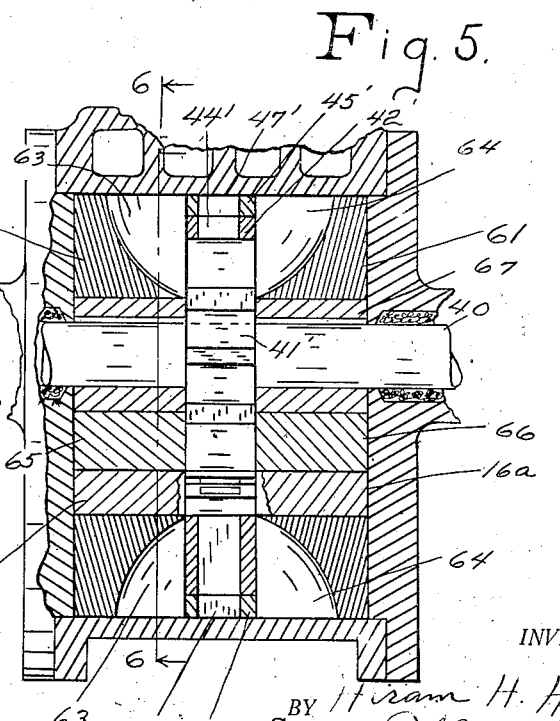
Figure 5 is a detail view taken on a section similar to that of Figure 2 and illustrating the application of interchangeable parts to the interior of the pump casing for the purpose of varying the capacity of the pump.
Figure 7:
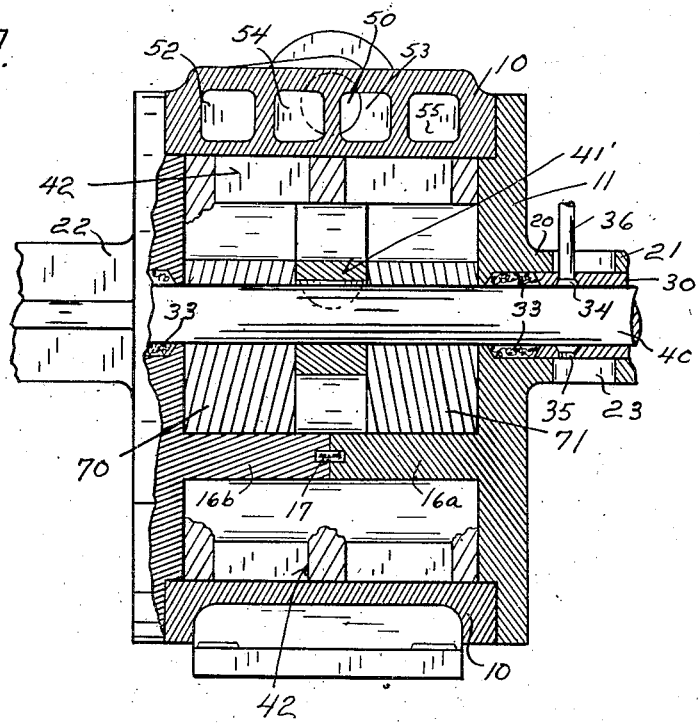
Figure 7 is a detail view similar to Figure 5 showing a further modified construction for varying the capacity of the pump.
Figure 8:
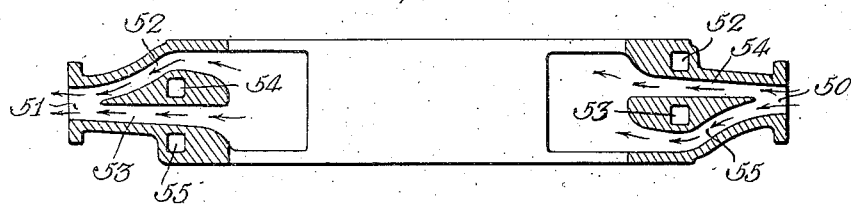
Figure 8 is a developed view of the divided inlet and outlet passages.

In Figure 7 I have shown a further modified construction for varying the capacity of the pump in a manner even more simple than that illustrated in Figures 5 and 6.

In the Figure 7 construction the original ring gear 42 is allowed to remain unaltered in the casing and variations in size are accomplished by the simple expedient of replacing pinion 41 with the shorter pinion 41' and inserting upon either side of pinion 41' filler members 70 and 71 which are similar to filler members 65 and 66 previously described but differ in that the Figure 7 construction includes no hub for pinion 41'. Consequently filler members 70 and 71 are in direct contact with shaft 40.

In the Figure 7 construction fewer parts are required and with a given size of ring gear any desired capacity less than the maximum capacity of such ring gear may be had merely by interchanging suitable sets of replacement elements. Each such set will include a suitable size of pinion 41' and filler members 70 and 71. It will be clear that two filler members 70 and 71 are employed in order to position the pinion approximately centrally instead of locating the pinion clear at one side of the casing as would be the case if the entire space left vacant by the pinion was filled by a single filler member. By having the pinion disposed centrally within the ring gear it will be obvious that the relatively elongated interdental space in the ring gear will comprise oversize ports for the admission of fluid to and from the areas of mesh between the pinion and gear.

I claim:

1. In a device of the character described, the combination with a pump casing and a rotary pump mechanism therein, of inlet and outlet passages communicating with opposite portions of said casing and passing each other to open in opposite directions and opposite to the portions of the casing with which they communicate, said passages being sub-divided at the point at which they pass and provided with alternating portions in staggered relation whereby a fluid passing through said casing will be distributed thereto and collected therefrom throughout the axial length of the casing with gradual change of direction and with little obstruction of flow.

2. In a device of the character described, the combination with a pump casing and mechanism therein adapted to produce a flow of material circuitously of said casing, of inlet and outlet passages opening to receive and discharge material in substantially like directions and communicating with said casing at points on opposite sides thereof, said passages being curved toward said points to communicate with the interior of said casing substantially tangentially with reference to the circuitous path of material therein and being sub-divided to pass each other with portions in alternating relation, whereby material entering and leaving said casing will follow a substantially directed path thereto throughout the axial length of the casing with no sudden change of direction and with consequent small degree of obstruction.

3. In a device of the character described, the combination with a pump casing having inlet and outlet ports, a driving pump pinion operatively mounted in said casing, and a driven internal gear operatively meshing with said pinion and provided with fluid passages affording communication between its inner and outer peripheries; of a floating bushing interposed between said gear and said casing and provided with peripherally spaced radially extending openings about its entire circumference, whereby to afford communication between the passages of said gear and the ports of said casing in different positions of rotation of said bushing, the passages of said gear being extended to interdental spaces thereof and also to points on the teeth thereof, and the openings in said bushing being so spaced that they cannot wholly obstruct two consecutive passages in said gear simultaneously.

4. In a device of the character described, the combination with a casing adapted interchangeably to receive sets of pumping rotors having varying capacities, of a set of pumping rotors including a pinion and an internal gear of less axial extent than said casing, and an annular filling member adapted to fit between the side of said gear and the adjacent wall of the casing.

5. In a device of the character described, the combination with a casing adapted interchangeably to receive sets of pumping rotors having varying capacities, of a set of pumping rotors including a pinion and an internal gear of less axial extent than said casing, and an annular filling member adapted to fit between the side of said gear and the adjacent wall of the casing, said filler member being provided with a port adapted to register laterally with the interdental spaces of said gear.

6. In a device of the character described, the combination with a casing adapted interchangeably to receive sets of pumping rotors having varying capacities, of a set of pumping rotors including a pinion and an internal gear of less axial extent than said casing, and an annular filling member adapted to fit between the side of said gear and the adjacent wall of the casing, said gear being provided with radial delivery passages and said filler member being provided with passages adapted to register laterally with interdental spaces of said gear, whereby to augment the capacity of said radial passages.

7. In a device of the character described, the combination with a ported pump casing adapted to receive rotary pumping elements in sets of varying capacities, of a shaft operatively mounted in said casing, a pumping pinion on said shaft having less axial extent than said casing, a pump gear operatively meshing within said pinion and operatively guided from said casing for rotation therein, and filler means receivable in said casing and complementary to the said pinion and gear, whereby to render such pinion and gear operative in a comparatively oversize casing.

8. In a device of the character described, the combination with a ported pump casing adapted to receive rotary pumping elements in sets of varying capacities, of a shaft operatively mounted in said casing, a pumping pinion on said shaft having less axial extent than said casing, a pump gear operatively meshing within said pinion and operatively guided from said casing for rotation therein, and filler means receivable in said casing and complementary to the said pinion and gear, whereby to render such pinion and gear operative in a comparatively oversize casing, said filler means comprising annuli positioned in said casing upon either side of said pinion, whereby to maintain said pinion in a position central with reference to the ports of said casing.

9. In a device of the character described, the combination with a ported pump casing adapted to receive rotary pumping elements in sets of varying capacities, of a shaft operatively mounted in said casing, a pumping pinion on said shaft having less axial extent than said casing, a pump gear operatively meshing within said pinion and operatively guided from said casing for rotation therein, and filler means receivable in said casing and complementary to the said pinion and gear, whereby to render such pinion and gear operative in a comparatively oversize casing, said filler means comprising annuli positioned in said casing upon either side of said pinion, whereby to maintain said pinion in a position central with reference to the ports of said casing and provided with passages opening laterally and radially toward the ports of said casing.

10. In a device of the character described, the combination with a ported pump casing adapted to receive rotary pumping elements in sets of varying capacities, of a shaft operatively mounted in said casing, a pumping pinion on said shaft having less axial extent than said casing, a pump gear operatively meshing within said pinion and operatively guided from said casing for rotation therein, and filler means receivable in said casing and complementary to the said pinion and gear, whereby to render such pinion and gear operative in a comparatively oversize casing, said filler means comprising annuli positioned in said casing upon either side of said pinion, whereby to maintain said pinion in a position central with reference to the ports of said casing and provided with passages opening laterally and radially toward the ports of said casing, said gear having radial passages adapted to receive and deliver material with reference to the ports of said casing and augmented in capacity by the capacity of the passages in said annuli.

11. In a device of the character described, the combination with a ported pump casing, of a plurality of sets of rotary pumping elements interchangeably receivable in said casing, said elements having differing pumping capacities, whereby to vary the ratio between the sizes of the ports of said casing and the capacity of the set of pumping elements therein.

12. As a new article of manufacture, a filler formed to be fitted within a pump casing operatively to enclose the interdental spaces of pumping gear elements therein.

13. As a new article of manufacture, a filler formed to be fitted within a pump casing operatively to enclose the interdental spaces of pumping gear elements therein, said filler comprising an annulus with a central aperture adapted to receive the pump shaft.

14. As a new article of manufacture, a filler formed to be fitted within a pump casing operatively to enclose the interdental spaces of pumping gear elements therein, said filler being provided with a passage positioned to open laterally from interdental spaces of pumping gear elements with which it is associated.

15. As a new article of manufacture, a filler formed to be fitted within a pump casing operatively to enclose the interdental spaces of pumping gear elements therein, said filler being provided with circumferentially spaced, laterally opening passages positioned to communicate with interdental spaces in pumping gear elements with which the filler is associated, the number of such passages being sufficient to facilitate egress of material from said pumping elements irrespective of the position of said filler, whereby said filler may be floated within a pump casing.

16. In a device of the character described, the combination with a pump casing and a ring gear fitting therein, of a pinion operatively mounted for rotation within said ring gear and in mesh therewith, said pinion being of less axial extent than said ring gear, and a filler interposed within said ring gear and between one end of said pinion and an adjacent wall of said casing.

17. In a device of the character described, the combination with a pump casing and a ring gear fitting therein, of a pinion operatively mounted for rotation within said ring gear and in mesh therewith, said pinion being of less axial extent than said ring gear, and filler means complementary to said pinion gear and casing and adapted to render said pinion operative for pumping purposes.

18. In a device of the character described, the combination with a pump casing and a ring gear fitting therein, of a pinion operatively mounted for rotation within said ring gear and in mesh therewith, said pinion being of less axial extent than said ring gear, and filler members inserted upon either side of said pinion between the ends of said pinion and the adjacent walls of said casing.

19. In a device of the character described, the combination with a pump casing and a ring gear fitting therein, of a pinion operatively mounted for rotation within said ring gear and in mesh therewith, said pinion being of less axial extent than said ring gear, and filler members inserted upon either side of said pinion between the ends of said pinion and the adjacent walls of said casing, said filler members being adapted to position said pinion substantially centrally of said gear whereby the relatively elongated interdental spaces of said gear will afford oversize passages leading to and from the point of mesh between said gear and pinion.

HIRAM H. HAIGHT.